United States Patent
Ho et al.

(10) Patent No.: US 6,453,676 B1
(45) Date of Patent: Sep. 24, 2002

(54) 50 POUND THRUST LEVEL TURBOJET ENGINE

(75) Inventors: Wu-Chi Ho; Ling-Chia Weng; Tzeng-Wuu Wey, all of Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/605,841

(22) Filed: Jun. 29, 2000

(51) Int. Cl.⁷ ................................................. F02C 3/14

(52) U.S. Cl. .......................... 60/804; 60/732; 60/755; 60/756

(58) Field of Search .................. 60/39.36, 737, 60/755, 756, 757

(56) References Cited

U.S. PATENT DOCUMENTS 2,977,760 A * 4/1961 Soltau et al. ............... 60/39.36
4,474,014 A * 10/1984 Markowski .................. 60/738
5,577,380 A * 11/1996 Sheckleton et al. ........ 60/39.36

* cited by examiner

Primary Examiner—Charles G. Freay
(74) Attorney, Agent, or Firm—Bacon & Thomas, PLLC

(57) ABSTRACT

A structure of a 50 pound thrust level gas turbine jet engine combustor is a small type 50 pound gas turbine jet engine combustor. The combustor includes a combustor outer liner, a combustor inner liner and a hub. Pressure swirl fuel atomizer and thin film cooling devices are further used. In the combustor, a primary jet flow is matched with a jet tube so as to build a stable recirculation in the primary zone. 12 SIMPLEX fuel atomizers are installed in the inner liner for jetting fuel radially. The fuel must be jetted properly, if it is too close the front plate, the droplet will impact the front plate, then the downstream will possible destroy the recirculation structure. Therefore, if the fuel is jetted in proper positions, then the retaining time of fuel will be reduced greatly and the burning in the primary zone can be enhances. By analyzing and testing, it is appreciated that high temperature will induce at the middle section near the wall of the inner liner. Thus, a one way thin film cooling means and a bidirection thin film cooling means are designed for protecting the liner.

7 Claims, 5 Drawing Sheets

50 POUND THRUST LEVEL TURBOJET ENGINE

BACKGROUND OF THE INVENTION

1. Field of the Invention

The present invention relates to a 50 pound thrust level gas turbojet engine combustor structure, and especially to a through flow annular combustor employed in a 50 pound thrust level turbojet engine, and meanwhile the finite space in the engine is employed sufficiently and the flame stable effect is preferred in the primary zone, moreover, the combustor liner wall is well protected using film cooling means.

2. Description of the Prior Art

The prior art 50 pound level turbojet engines were only developed by Sunstrand and Teledyne Cos. U.S. The features of the prior art engines are that: the compressor and turbine are adapted with a back to back structure. The rotor has a solid structure. Two bearings are located at the front and rear ends of the mono-rotor. Moreover, a single stage centrifugal type compressor, a single stage turbine, and a reverse combustor are adopted. Besides, the fuel atomizing system is an air blast atomizing system used by an engine with the same thrust level.

In the combustor, other than the reverse combustor, a fuel slinger combustor is used, which is designed dependent on the integrality and type of the engine. However, the prior art combustor has a complex structure, and is difficult in manufacturing. In order to match the requirements of the engine cycle and the requirement of thrust, the combustor has a large size and occupies a large space. Furthermore, the size of the engine is enlarged so that the wind surface of the engine is increased. This is a problem necessary to be overcome in design.

Moreover, in the fuel atomizing system, in prior art engine uses a airblast or slinger system. However, in use of the fuel atomizer, generally, there are foaming type atomizer, electrostatic atomizer, supersonic atomizer, pressure atomizer, rotary atomizer, air assisted atomizer and air blast atomizer, etc, which are used dependent on the requirements of design (such as cost, thrust, fuel flow, etc.). In general, in above atomizers, the pressure atomizer, rotary atomizer, air auxiliary atomizer and air flow atomizer are used in the combustor of an engine for atomizing fuel.

The prior art engine uses a air blast atomizing system in a high pressure environment. However, since the system has a complex structure, and is difficult to be manufactured so that the cost of the engine is increased. Moreover, for a small type engine, air blast system has a bad efficiency, especially, in lower speed operation (for example, actuating an engine, low speed operation, etc.). This will induce that the engine is not easily in starting.

Moreover, in the slinger atomizing system, the rotary atomizer is likely to be operated in high speed for presenting a preferred fuel atomizing effect. This will induce that the engine is difficult in operation, has a higher cost and is difficult in design.

For a detailed background of a 50 pound thrust level gas turbine jet engine combustor structure one may refer to Taiwan Patent Nos. 325096 and 154153.

It should be appreciated that in the basic requirement in the design of a combustor, a flame stabilization means should be applied in the primary zone at first, namely, in a reasonable burning time, the fuel will be consumed completely for releasing energy. The flame stable means will change with the operating conditions of the combustor so as to affect the operation range of the Thus, from above description, it is apparent that the prior art design is primarily studied from the experience of the engine manufacturer. The difficult for actuating an engine or in slow fire reduction in the engine after ignition so that the turbine will suffer from an overheating environment may be improved by changing the atomizing system and ignition energy. However, this is not easily.

SUMMARY OF THE INVENTION

One object of the present invention is to provide a turbojet engine combustor with a 50 pound thrust engine (with an outer diameter of 5.2 inches).

Another object of the present invention is to provide a 50 pound thrust level turbojet engine combustor structure with a jet tube design so as to stabilize the recirculation zone and increase the penetration depth of the primary jets. Thus, the zone may move toward the outer liner.

A further object of the present invention is to provide a 50 pound thrust level gas turbine jet engine combustor structure having a straight type combustor. The 50 pound thrust level turbojet engine can be manufactured easily with a lower cost.

Another object of the present invention is to provide a 50 pound thrust level turbojet engine combustor structure, wherein as the engine is operated in lower speed, it has a good fuel atomizing effect.

Another object of the present invention is to provide a 50 pound thrust level turbojet engine combustor structure which can be assembled, maintained and updated easily.

Another object of the present invention is to provide a 50 pound thrust level turbojet engine combustor structure using the principle of aerodynamics for protecting the liner of the combustor effectively.

The other object of the present invention is to provide a 50 pound thrust level turbojet engine combustor structure, wherein a bidirection thin film cooling is used for protecting the liner wall of the combustor.

A structure of a 50 pound thrust level turbojet engine combustor being a through flow annular combustor is provides in the present invention, which comprises: a combustor outer liner, the jet holes arranged with equal circumferential space on the outer liner wall. Further, the inner surface facing the hot stream is formed with circular protrusions with respect to the air inlets so as to be formed as a thin film cooling means for protecting the outer liner. A round hole for receiving an igniting device is formed in a front end of the outer liner. There are 24 primary jets, 24 dilution jets and 24 dilution enhancement jet holes are installed at the front, middle and rear sections of the outer liner.

Twenty-four jet tubes with a length of 8 mm are installed in a primary jet hole for increasing the penetration depth of the primary jet and thus enhancing the recirculation in the primary zone in order that the flame in the primary zone moves to the outer liner to enhance the combustion load. Moreover, the jet tubes serves to cool the inner liner.

A combustor inner liner: A plurality of jet holes arranged with equal circumferential space are installed at proper positions on the inner liner. Further, circular protrusions are installed at a wall normal to the outer diameter with respect to the air inlets so as to be formed with a bidirection thin film cooling means and a one way thin film cooling means for protecting the outer wall of the liner.

A hub: The rear axial portion thereof is combined with the inner liner of the combustor. Besides, a circular flange is installed at the outer axial periphery thereof for combining and positioning the outer liner of the combustor. The front end of the circular flange is formed as a slope surface. The slope surface is installed with air inlets arranged with an equal circumferential space. The air inlets are extended axially to be formed as a penetrating air hole. Twelve round holes arranged with an equal circumferential space are installed between the circular flange and the rear axial portion of the hub for receiving atomizers. Moreover, the front portion of the hub is installed with fuel inlets and lubricated oil inlets.

The above outer liner of combustor, jet tubes, and inner liner of combustor and the designs of fuel atomizer and bidirection thin film cooling are formed as a 50 pound thrust level turbojet engine combustor structure of the present invention.

In the annular combustor of the present invention, in order to forming a flame stable means, a primary jet flow serves to build a recirculation region in the primary zone. A lower speed flow region is built so that the transfer of the fuel may be matched with the flow speed. Radial jet flow serves to provides a long residence time for droplet so that the fuel can be burned completely and has a best effect. The recirculation structure of the present invention is formed by a primary jet flow to jet vertically to the combustor. The size of the recirculation region is dependent to the strength thereof and the momentum of the jet flow. A large recirculation region implies that a great pressure reduction, the efficiency of the combustion system will become worse. A weak recirculation region causes a bad mixing of fuel and gas so as to affect the combustion efficiency. Of course, the performance of the combustor is not only dependent on the recirculation region. Another important point is the inject position the droplet. If the inject position of the fuel is not proper, the recirculation is possibly destroyed so that the fuel and air does not mixed sufficiently or the fuel droplet will impinge on wall surface and other problems. In the present invention, the positions of fuel atomizers are properly installed for solving these problems.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
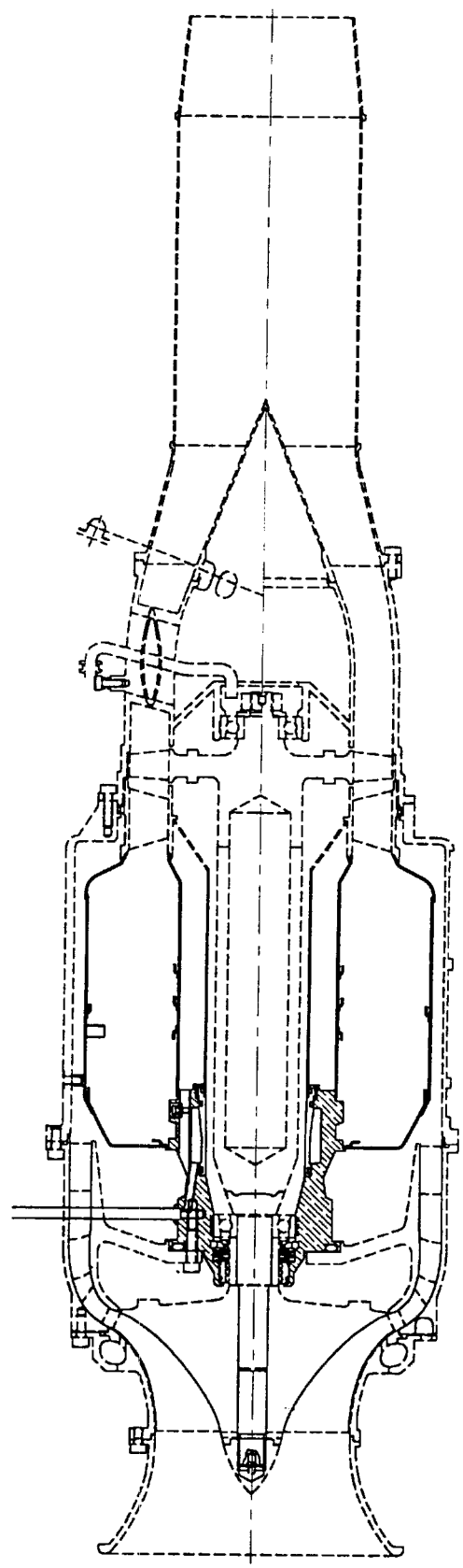
FIG. 1 is a schematic view showing the module position of the 50 pound thrust level turbojet engine combustor according to the present invention.
Figure 2:
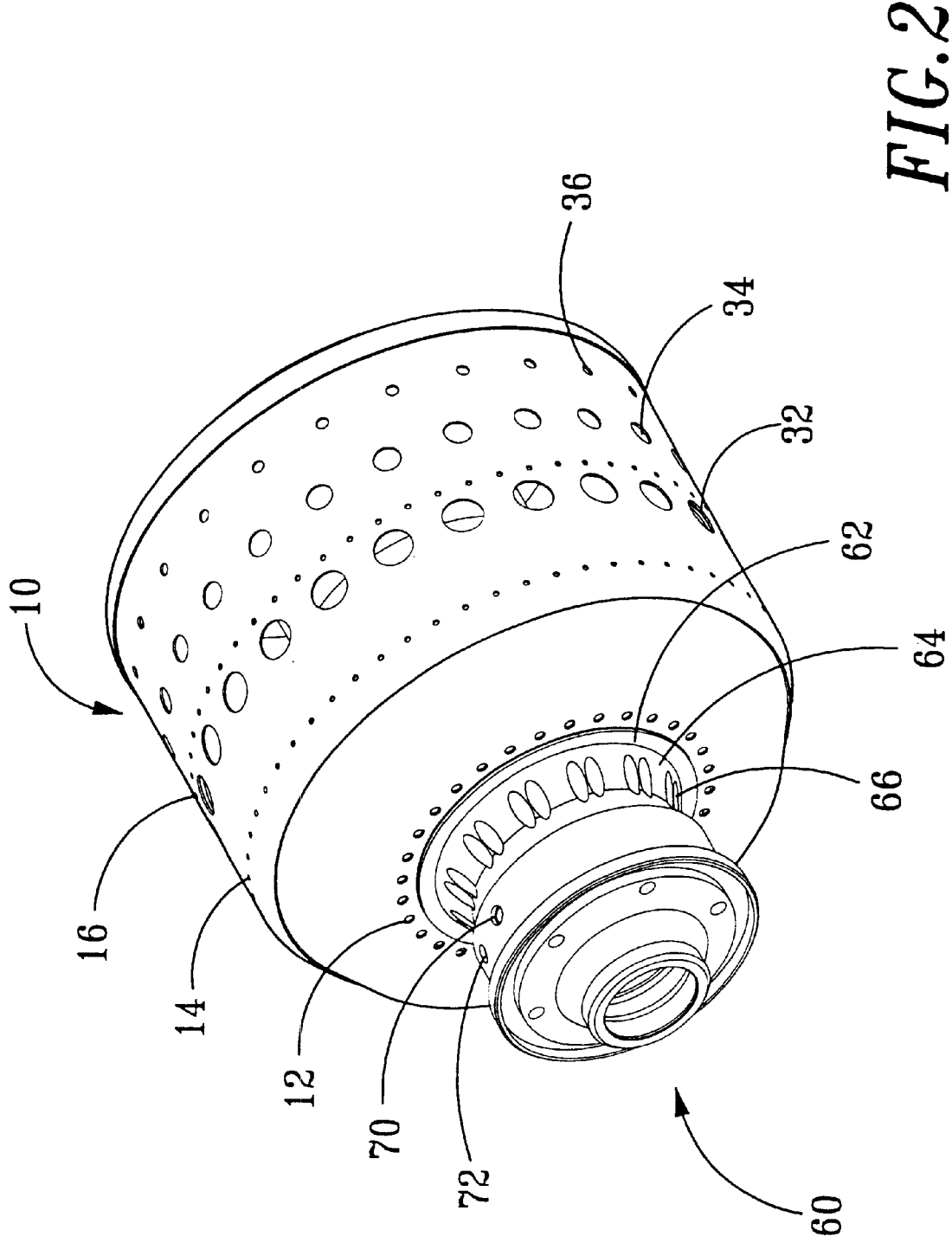
FIG. 2 is an perspective view schematically showing the 50 pound thrust level turbojet engine combustor structure according to the present invention.
Figure 3:
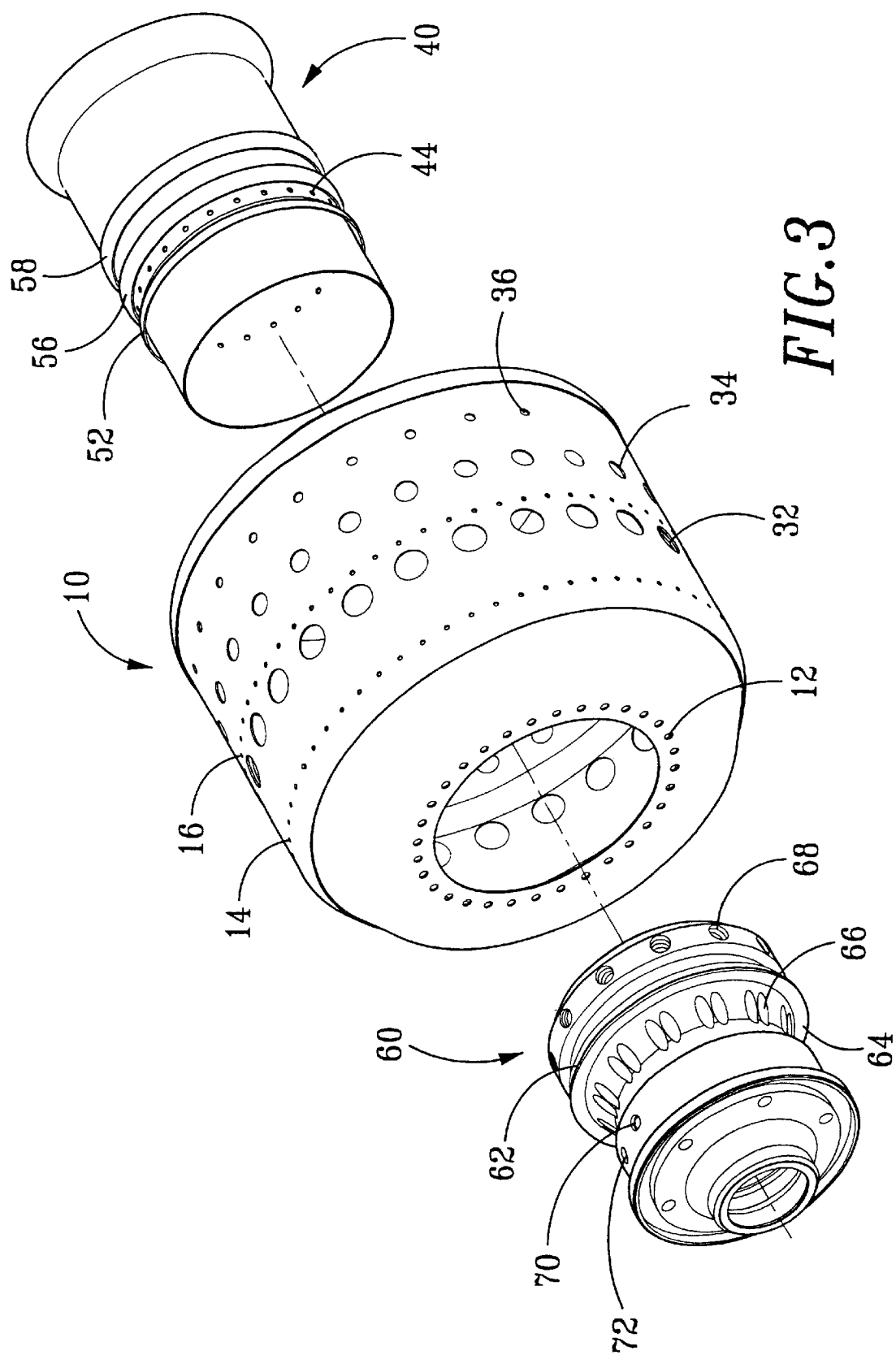
FIG. 3 is an exploded perspective view schematically showing the 50 pound thrust level turbojet engine combustor structure according to the present invention.
Figure 4:
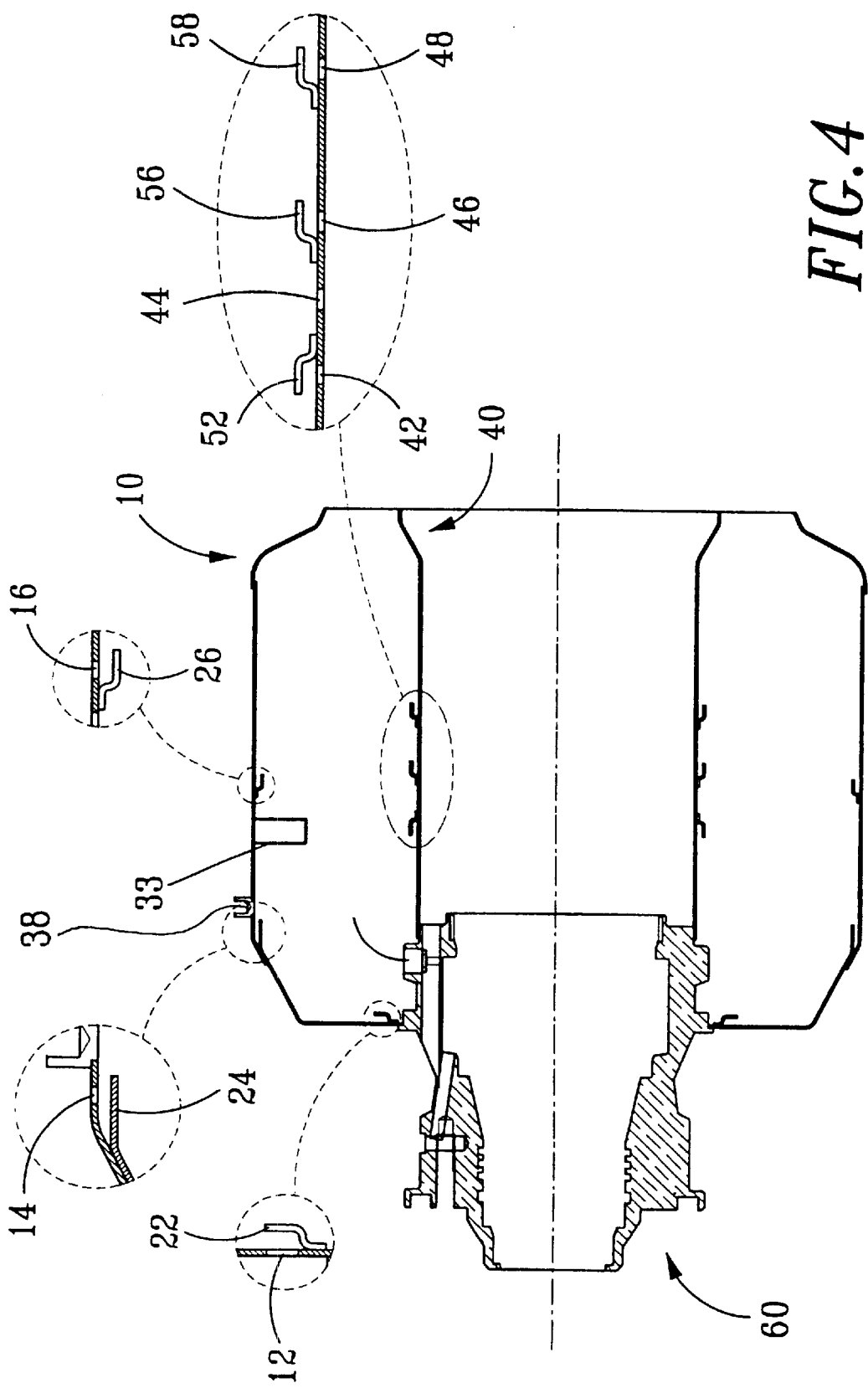
FIG. 4 is an assembled cross sectional view schematically showing the 50 pound thrust level turbojet engine combustor structure according to the present invention.

With reference to FIGS. 1 to 4, the combustor structure of a 50 pound level thrust level turbojet engine, which has a annular combustor structure, comprising:

A combustorouter liner 10: The radial surface and the front and middle sections of the outer diameter thereof are arranged with inlet holes 12. 14 and Besides, the inner wall of the outer liner 10 with respect to the inlet holes 12, 14 and 16 are installed with circular protrusions 22, 24, and 26 so as to be formed as a film cooling means for protecting the inner wall of the outer liner 10. Moreover, the front, middle, and final sections of the radial outer diameter of the outer liner 10 are installed with a primary jet 32, a dilution jet 34, and a dilution enhancement hole. The front end of the radial outer diameter of the outer liner 10 is installed with a round hole 38 for receiving an ignition device.

Jet tube 33: The primary jet 32 is installed with 24 jet tubes 33 of 8 mm length for increasing the penetration of the primary jet 32 and enhancing the recirculation of the primary zone so that as the flame of the primary zone moves to the outer liner 10, the combustion load can be enhanced. Furthermore, the inner liner 40 can be cooled.

A combustor inner liner 40: In the proper places of the axial outer diameter of the inner liner 40, inlet holes 42, 44, 46, 48 are arranged with an equal space. The wall normal an outer diameter of the inner liner 40 with respect of the inlet holes, 42, 46, 48 are installed with circular protrusions 52, 56, and 58 so as to be formed as a bidirection gas thin film cooling means and a single way thin film cooling means for protecting the outer wall of the inner liner 40. The reason for installed multiple thin film cooling means is that the place near the inner liner wall will occur high temperature from the analysis of fluid field and test of parts.

A hub 60: the shaft at the rear section thereof is combined with a combustor inner liner 40. A circular flange 62 is installed at the outer axial periphery. The front edge of the circular flange 62 is formed as an inclined surface 64. A plurality of inlet holes 66 are arranged on the inclined surface with an equal circumferential space. The inlet holes 66 are extended axially to be formed as penetrating holes. Holes 68 spaced with an equal circumferential space are installed between the front section of the circular flange 62 and the rear section of the hub 60 for receiving an atomizer. Furthermore, the front section of the hub 60 is installed with a fuel jet hole 70 and a lubricate oil injection hole 72.

The combustor structure of a 50 pound thrust level turbojet engine of the present invention is formed by aforesaid combustor outer liner 10, jet tube 33, combustor inner liner 40 to match with the hub 60, and then the structure is combined with an atomizer and the design of single or bidirection thin film cooling means.

In the structure of the aforesaid circular combustor, on the combustor outer liner 10, jet tube 33, combustor inner liner 40, the single or bidirection film cooling means constructed by inlet holes and circular protrusion serves to protect the liner of the combustor. In the limit space of a small type engine, the parts will not be burned due to the high temperature of burning. This is because the outer gas flow is guided into the combustor through inlet holes and then is guided by a circular protrusion so that the gas will flow in parallel to the liner wall so as to form gas cool thin film on the liner wall and reduce the liner wall temperature of the combustor so as to achieve the effect of protecting the wall surface. To avoid the engine starting difficulty of the prior art, pressure atomizers are used to maintain atomization performance and combustion efficiency. Besides, in the design of the gas jet, in order to meet the requirement of flow field of combustor and flame stable means, a primary jet 32 and a dilution jet 34 are installed so that the fuel within the combustor can be burned completely and reduce the loss to attain a preferred efficiency. Furthermore, for the installation of the dilution enhancement hole 36, the high temperature gas in the dilution jet flow is diluted and the temperature is reduced to an operating temperature. In one hand, the temperature of outer liner is protected, in the other hand, the temperature pattern factor of outlet is reduced to protect the components of turbine.

Figure 5:
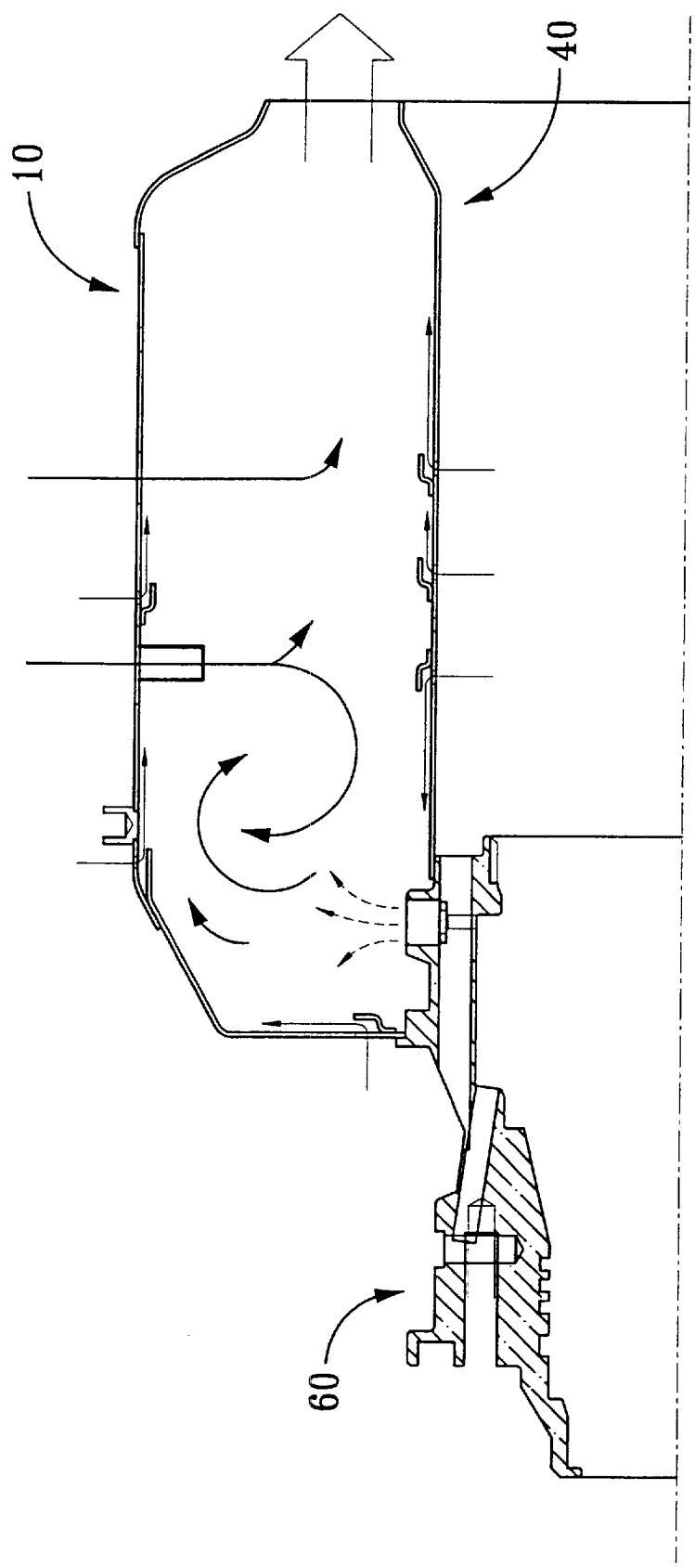
FIG. 5 is a schematic view showing the recirculating flow field of the 50 pound thrust level turbojet engine combustor structure according to the present invention.

With reference to FIG. 5, in the annular combustor of the present invention, the flame steady means of the present invention are disposed in a recirculation region. A low speed flow region is constructed for providing a longer fuel stopping time so as to be beneficial to the transmission of fire and thus the fuel can be burned completely to provide a preferred effect. The flow field of loop flow or recirculation zone in the primary zone of the present invention is formed primarily by the vortex flow of the radial flow from the primary jet 32, the jet tube 33, and an fuel atomizer and wall jet flow by cooling of thin film. Therefore, the structure of flow field in the primary zone is very complex. The object of wall jet flow is to close the vortex flow generated by gas jet flow so as to form a vortex region. Not only the oxygen in the primary zone is increased, but also the mixing effect of turbulent flow is increased. Moreover, a flame stable reverse flow may be generated after jet flow. While dilution jet 34 provides what needed in second combustion. The mixing object in the primary zone may be burned completely so as to reduce lose and thus have a preferred effect.

By the design of the structure of recirculating flow in aforesaid flame stabilization mechanism, in the present invention, 12 pressure swirl atomizers are used. The atomized fuel is injected radially so that the fuel retaining time is prolonged. By the reverse flow, the fuel can be burned completely so as to provide a preferred effect.

The 50 pound level thrust level turbojet engine of the present invention has the following advantages with comparing to the aforesaid prior art:

1. By the 50 pound level thrust level turbojet engine of the present invention, since the combustor has a annular straight current and is matched with the requirement of the engine so as to use a finite space sufficiently. Therefore, a 50 pound level small turbojet engine can be acquired.
2. By a design of a pressure swirl atomizer, the engine can be actuated easily and the low speed is reduced greatly for enhancing the performance of the engine.
3. By the structure of the turbojet combustor according to the present invention, the combustor is designed according to the principle of aerodynamics, and by using an fuel atomizer, the jet fuel enters into the atomizer along the path of reverse flow so as to have a preferred flame stable effect in the primary zone.
4. By the structure of the turbojet engine combustor according to the present invention, since the combustor has a very small volume, a thin film cooling design is used to protect the inner and outer liner of the combustor so that the liner wall of the combustor will not be destroyed by high temperature.
5. The structure of the turbojet engine combustor according to the present invention has the effects of easily assembling, manufacturing, maintenance and updating and low cost.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A structure of a 50 pound thrust level turbojet engine combustor, the combustor being a through flow annular combustor type, the structure comprising:
   a combustor outer liner, a first series of air inlets arranged circumferentially in a dome region thereof, the first series of air inlets are spaced apart, a second series of air inlets spaced circumferentially around the outer liner to create a primary jet, a dilution jet, and a dilution enhancement jet;
   circular protrusions installed on a hot surface of the outer liner so as to form a film cooling means for protecting the outer liner;
   a round hole for receiving an ignition device being formed in a front end of the outer liner;
   a jet tube installed in a primary jet hole of the outer liner, the primary jet hole increases penetration depth of the primary jet in order to facilitate generation of recirculating flow in a primary zone;
   a combustor inner liner, a third series of air inlets arranged circumferentially around the inner liner at spaced-apart positions on the inner liner;
   circular protrusions are installed on a hot surface of the inner liner to form a bidirection film cooling means and a one way film cooling means for protecting the inner liner;
   a hub, a rear axial portion thereof being combined with the inner liner of the combustor, a circular flange being installed at an outer axial periphery thereof for combining and positioning the outer liner of the combustor;
   a front end of the circular flange being formed as a slope surface, the slope surface being installed with air inlets arranged circumferentially thereof;
   the air inlet being extended axially to be formed as a penetrating air hole;
   round holes circumferentially spaced and installed between the circular flange and the rear axial portion of the hub for receiving at least one atomizer; and
   a front portion of the hub having fuel inlets and lubricating oil inlets.

2. The structure of a 50 pound thrust level turbojet engine combustor as claimed in claim 1, wherein there are twenty-four primary jet holes on the outer liner of the combustor.

3. The structure of a 50 pound thrust level turbojet engine combustor as claimed in claim 1, wherein there are twenty-four dilution jet holes on the outer liner of the combustor.

4. The structure of a 50 pound thrust level turbojet engine combustor as claimed in claim 1, wherein there are twenty-four dilution enhancement jet holes on the outer liner of the combustor.

5. The structure of a 50 pound thrust level turbojet engine combustor as claimed in claim 1, wherein arrangement among the primary, dilution and dilution enhancement jet holes on the outer liner of the combustor are axially staggered.

6. The structure of a 50 pound thrust level turbojet engine combustor as claimed in claim 1, wherein there are twelve round holes on the hub that are installed with a plurality of the atomizers.

7. The structure of a 50 pound thrust level turbojet engine combustor as claimed in claim 1, wherein the atomizer installed on the hub is a pressure swirl atomizer that injects fuel radially.

* * * * *